Jan. 6, 1970

R. A. JOHNSON 3,488,608

GENERAL STOPBAND MECHANICAL DISC FILTER SECTION
EMPLOYING MULTI-MODE DISCS

Filed Feb. 8, 1967

INVENTOR.
ROBERT A. JOHNSON
BY Moody and Phillion
ATTORNEYS $$C_1 = C_3 = C_{15}$$
$$\frac{1}{L_1} = \frac{1}{L_5} + \frac{1}{L_{15}}$$
$$\frac{1}{L_3} = \frac{1}{L_{16}} + \frac{1}{L_{15}}$$

$$\frac{1}{L_5} = \frac{1}{L_6} + \frac{1}{L_7}$$

$$\frac{1}{L_{16}} = \frac{1}{L_{10}} + \frac{1}{L_{11}}$$

INVENTOR.
ROBERT A. JOHNSON
BY
Moody and Phillips
ATTORNEYS $L_8 = L_{11}$
$L_{18} = \dfrac{L_9}{2}$
$C_{18} = 2C_9$

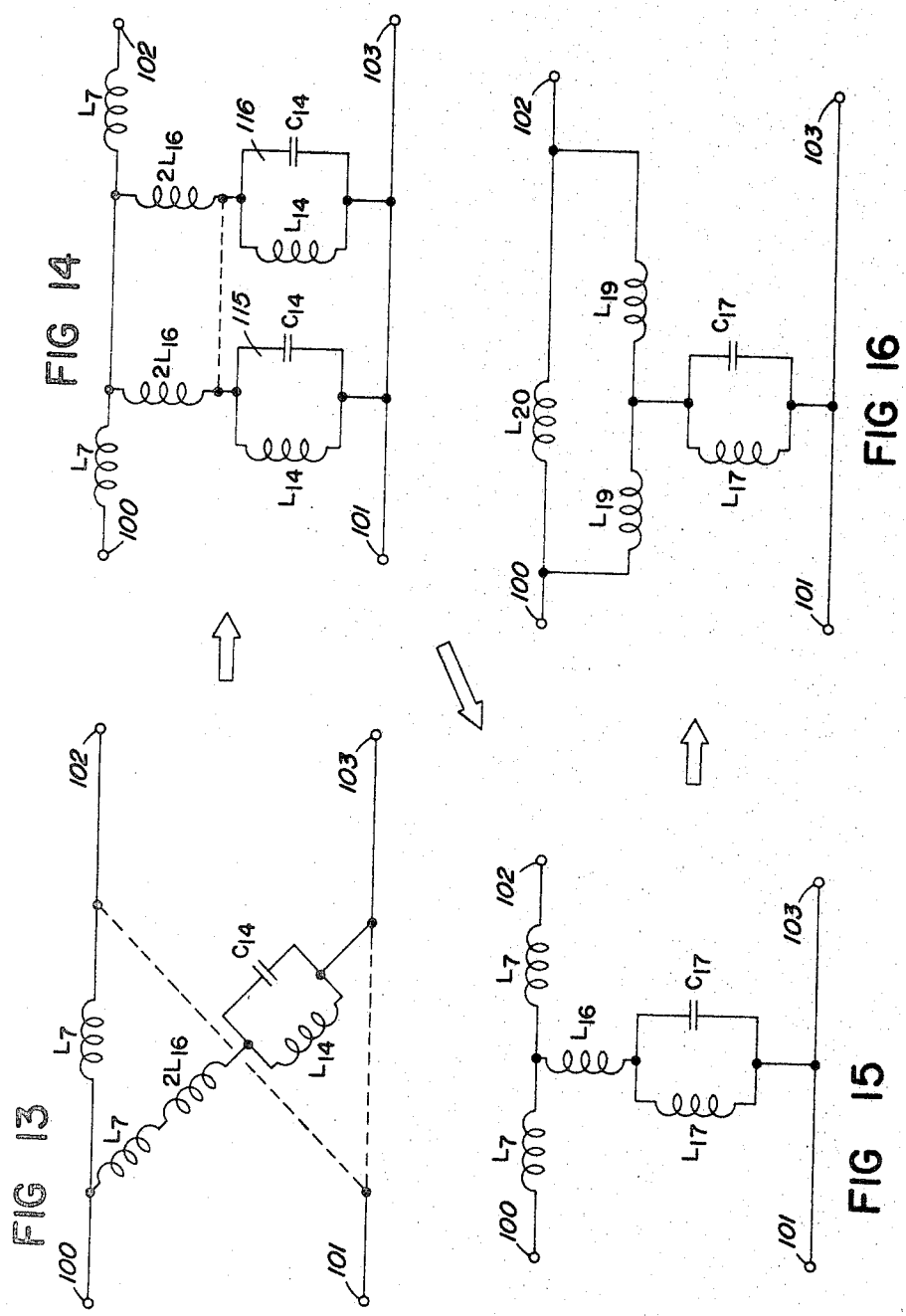

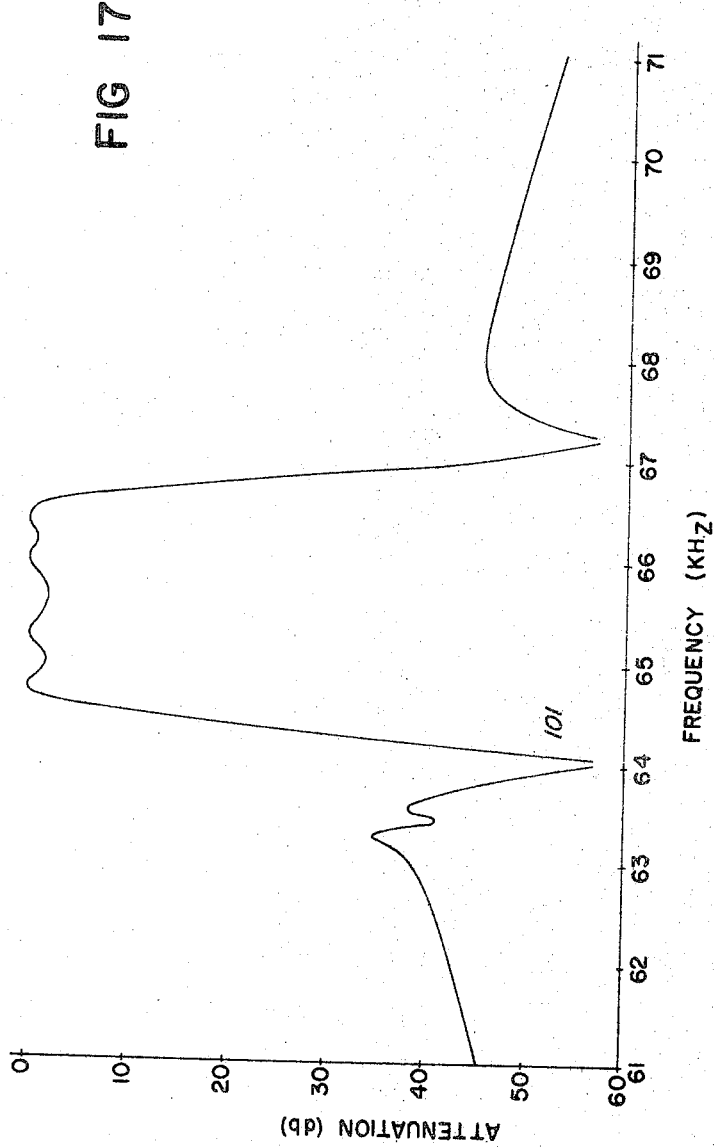

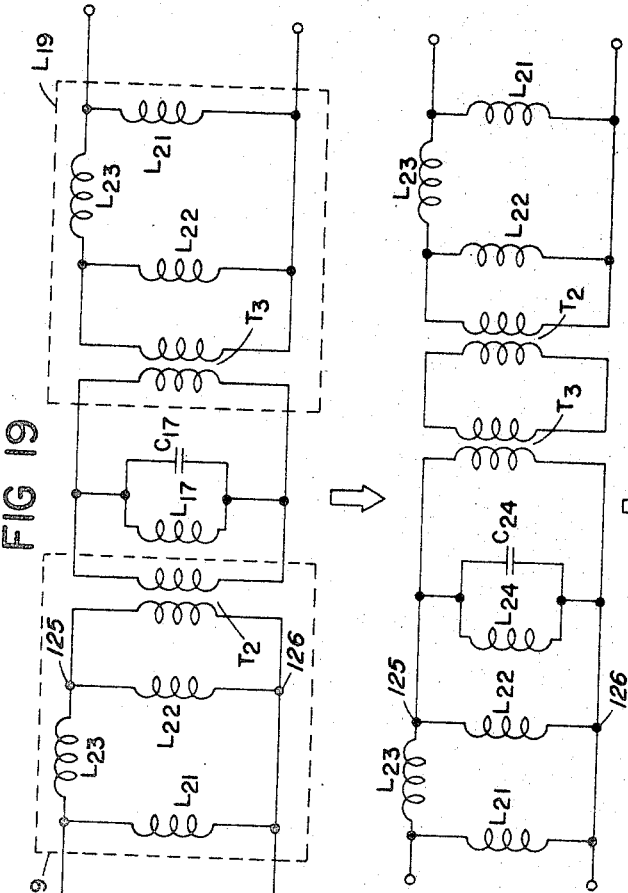

$$\frac{1}{L_{29}} = \frac{1}{L_{15}} + \frac{1}{L_{25}} + \frac{1}{L_{21}}$$
$$\frac{1}{L_{30}} = \frac{1}{L_{24}} + \frac{1}{L_{22}} + \frac{1}{L_{22}}$$
$$\frac{1}{L_{31}} = \frac{1}{L_{28}} + \frac{1}{L_{26}} + \frac{1}{L_{26}}$$

INVENTOR.
ROBERT A. JOHNSON
BY
Moody and Phillips
ATTORNEYS

United States Patent Office 3,488,608
Patented Jan. 6, 1970

3,488,608
GENERAL STOPBAND MECHANICAL DISC FILTER SECTION EMPLOYING MULTI-MODE DISCS
Robert A. Johnson, Tustin, Calif., assignor to Collins Radio Company, Cedar Rapids, Iowa, a corporation of Iowa
Filed Feb. 8, 1967, Ser. No. 614,621
Int. Cl. H03h 7/10
U.S. Cl. 333—71       13 Claims

ABSTRACT OF THE DISCLOSURE

A mechanical bandpass filter of the stacked disc type employing a multi-diameter mode type disc with appropriate coupling wire arrangement so that a single multi-diameter mode disc acts as two separate diameter mode type discs. The resultant filter has a twin T topology and is capable of realizing a general stopband equal ripple passband amplitude response.

---

This invention relates generally to mechanical filters of the stacked disc type and, more particularly, to a general stopband mechanical filter of the stacked disc type employing a multi-mode disc which performs the functions of two discs.

Recent developments in the mechanical filter art have resulted in several mechanical filter structures having attenuation poles either at the top edge of the passband or at the bottom edge thereof, or at both the top and bottom edges. If attenuation poles can be placed in either the upper or lower stopbands, or in both stopbands, at points specified by the designer the filter is known as a general stopband filter.

Generally speaking, the prior art mechanical filter structures obtain their frequency response characteristics by the employment of various combinations of circle mode and diameter mode discs and various arrangements of coupling wires in such a manner that the energy transferred through one set of coupling wires is, at the top and/or bottom edges of the passband, equal to and 180° out of phase with the energy transferred through the other set of coupling wires, thereby causing cancellation of the two energies with resultant attenuation poles.

To provide a background for the present invention, reference is made to U.S. Patent 3,135,933 issued June 2, 1964 to R. A. Johnson and entitled " 'M' Derived Mechanical Filter." In this patent an attenuation pole is created at the upper edge of the passband through the use of circle mode discs and an arrangement of coupling wires. For purposes of definition, a circle mode disc is defined as one whose mode of vibration is such that the nodal lines are circular in nature and concentric with the axis of the disc. In the case of a diameter mode disc, the nodal lines lie along the diameters of the disc and frequently occur in pairs with the two diameter nodal lines positioned in quadrature and with the phase of vibration of adjacent 90° sectors of the disc, as defined by the nodal lines, being 180° out of phase with each other.

The operation of the "M" derived filter is predicated upon the fact that at the lower end of the passband, adjacent discs vibrate in phase with each other, while at the upper end of the passband adjacent discs vibrate 180° out of phase with each other. Consequently, by segmenting one of the discs, i.e., removing a portion of the perimeter thereof, and securing a coupling wire from a first disc across the segmented disc to a third disc on the other side of said segmented disc, a transfer of energy occurs between the first and third disc which, at the upper end of the passband, is 180° out of phase with the energy transferred from the first to the second to the third disc through conventional coupling wires connected to all three discs.

Through the passband the attenuation occurring at each juncture of coupling wire and disc is relatively small due to the natural resonance of the system, so that the energy transferred from disc to disc within the passband through conventional coupling wires, is large and is, in fact, directly proportional to the cross-sectional area of the conventional coupling wires. On the other hand, the cross-sectional area of the bridging wire is relatively small so that the energy transferred therethrough within the passband is small. In the upper stopband, however, the amount of energy transferred through the coupling wires decreases appreciably as the attenuation at each connection between disc and coupling wire becomes increasingly greater. Since the bridging wire is coupled to only two discs, whereas the conventional coupling wires are each coupled to three discs, the energy transferred through the conventional coupling wires decreases at a higher rate than the decrease of energy through the bridging coupling wire, and a point is reached where the energies transferred through the conventional coupling wires and the bridging wires are equal but opposite. It is at this point that an attenuation pole occurs.

In other prior art devices diameter mode discs are used in combination with circular mode discs to obtain attenuation poles. More specifically, in one prior art device, a first, second, third, and fourth disc are stacked one upon the other with their axes lying along a common line and spaced apart a fraction of a wavelength, and with the first disc being a diameter mode disc and the second, third, and fourth disc being circle mode discs. Conventional coupling wires couple together all four discs and bridging wires couple together only the first diameter mode disc and the fourth circle mode disc. The conventional coupling wires are connected to segments of the diameter mode disc which vibrate 180° out of phase with the segments of said diameter mode disc to which the bridging wire is attached. Thus at the lower end of the passband, where the discs vibrate in unison, an attenuation pole is obtained since the segment of the diameter mode disc to which the bridging wire is attached vibrates 180° out of phase with the segment to which the conventional wires are attached. An attenuation pole is also obtained at the upper end of the passband since the phase shift over the four discs coupled together by the conventional coupling wires is three times 180 or the equivalent of 180° phase shift, while the phase shift through the bridging wire is equal to 180° due to the coupling between the first and fourth discs plus another 180° due to the fact the bridging wire is connected to a segment of the diameter mode disc which vibrates 180° out of phase with those segments to which the conventional coupling wires are connected. Thus the overall phase shift of the energy through the bridging wire is 0°, and thereby is opposed to that energy transferred to the conventional coupling wires, at the upper end of the passband.

In the prior art devices described briefly above, each disc functions as a single disc, and in the last example of prior art cited four discs are required to obtain attenuation poles both above and below the top and the bottom edges of the passband.

It is a primary object of the present invention to provide a three-disc mechanical filter section having general stopband characteristics with attenuation poles above the passband, below the passband or above and below the passband.

Another object of the invention is to provide a general stopband mechanical filter of a simpler construction than known heretofore and with fewer discs required.

A further object of the invention is a general stopband mechanical filter having equal ripple passband behavior.

A fourth aim of the invention is a general stopband mechanical filter employing a multi-diameter mode disc with both modes lying within the passband to give the effect of two separate discs.

A fifth purpose of the invention is the improvement of general stopband mechanical filter structures, generally.

In accordance with the invention, there are provided first, second, and third discs stacked one above the other with their axes lying along a common line and spaced apart a fraction of the coupling wire wavelength at the midpoint of the passband. The first and third discs are circle mode type discs and the center disc is a multi-diameter mode type disc, all three discs being held in position by several sets of coupling wires. More specifically, a first pair of coupling wires extends along the perimeter of all three discs and is connected to each of the three discs, and in particular is connected at a nodal line of a first diameter mode frequency of said multi-mode disc. A second set of coupling wires connects said first disc to said center disc and in particular is connected to said center disc at a diameter nodal line of the second diameter mode frequency of said multi-mode disc. A third pair of coupling wires connects said center disc to said third disc and is connected specifically to a second nodal line of the second diameter mode frequency of said multi-mode disc. Thus, when the center multi-mode disc is in its first mode of vibration, the second and third pairs of coupling wires are each connected near the centers of segments of said multi-mode disc which vibrate 180° out of phase with each other. Thus in the lower stopband the energy transferred from the first disc to the third disc via the second and third coupling means is equal to but 180° out of phase with the energy transferred from the first disc to the third disc through the first set of coupling wires and the bridging wire, thereby effectively canceling each other and resulting in an attenuation pole.

At the upper end of the passband the second mode of vibration of the multi-mode disc predominates because of its closer proximity. In addition, the coupling wires 63 and 64 are larger in diameter than 65, 66, 67, and 69, hence there is greater coupling of energy by this means. Therefore, the first pair of coupling wires and a bridging wire are effective to create an attenuation pole in much the same manner as is created in the case of the "M" derived filter section discussed above as part of the prior art. More specifically, at the upper end of the passband the first pair of coupling wires is connected to all three discs with attenuation occurring at each disc. Further, the energy transfer from the first to the second to the third disc along the first pair of coupling wires undergoes two 180° phase shifts for a total of 360°. The energy transferred from the first disc to the third disc through the bridging wire undergoes only a 180° phase shift and suffers attentuation at only the first and third discs. Thus the energy transferred through the first pair of coupling wires and the bridging wire at a point above the upper edge of the passband are equal but opposite in phase, to thereby produce an attentuation pole.

In accordance with a feature of the invention, the two diameter modes of vibration of a single multi-mode disc plus two circle mode discs are employed to obtain a general stopband mechanical filter section and, further, to function effectively as a four-disc filter section.

The above-mentioned and other objects and features of the invention will be more fully understood from the following detailed description thereof when read in conjunction with the drawings in which:

FIGS. 5 through 16 are circuit transformations utilized in changing the lattice-type filter circuit of FIG. 4 to the schematic circuit form of FIG. 16, which is the same circuit as that of FIG. 3 which, in turn, is the electrical equivalent of the three-disc mechanical filter section of FIG. 2;

FIG. 17 shows a frequency response curve of an embodiment of the invention; and

FIGS. 18 through 23 are circuit transformations employed in changing the parameters of the equivalent electrical circuit of FIG. 9 to correspond to elements of a mechanical filter having feasible physical dimensions.

The general approach of this specification will be as follows. There will first be a discussion of the nature and use of multi-diameter mode type discs followed by a general description of the acual three-disc structure of the invention and its equivalent electrical circuit. Next discussed will be a lattice-type filter network, well known in the art, and which has a general stopband frequency response curve with attenuation poles both at the bottom and the top of the passband. Then, by series of circuit transformations, it will be shown how the aforementioned lattice-type filter network can be transformed into the identical equivalent circuit of the three-disc mechanical filter section, thus establishing that the three-disc mechanical filter section does, in fact, have general stopband characteristics. It should be noted that actual test models of the filter have the general stopband characteristics predicted in the theory.

Since the ultimate circuit derived from the transformations might not have parameters which would correspond to a mechanical filter section whose mechanical parameters were appropriate, i.e., having feasible diameters and thickness of the discs and of the coupling wires, other circuit transformations will be discussed showing how the parameters of the electrical equivalent circuit can be altered so that the size of the corresponding discs and coupling wires are suitable for use in an actual filter. Essentially, what is done in the last series of transformations is to alter the values of those components of the electrical equivalent circuit which correspond to the coupling wires of the mechanical filter so that the components of the electrical equivalent circuit representing the discs will be changed to values for which the corresponding discs will all have the same diameter, for example, and be of suitable thicknesses.

In accordance with the general approach set forth above, the specification will be discussed under titled sections, as listed below:

(I) General structure of three-disc mechanical filter section employing multi-diameter mode disc and equivalent circuit thereof.

(II) Transformations for converting well-known general stopband lattice type filter network to equivalent circuit of mechanical filter.

Figure 4:
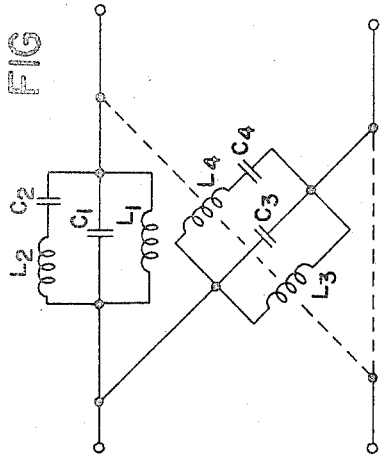
FIG. 4 is a schematic diagram of a single section lattice-type filter network of the general stopband variety having attenuation poles at both the upper and lower edges of the passband.
Figure 6:
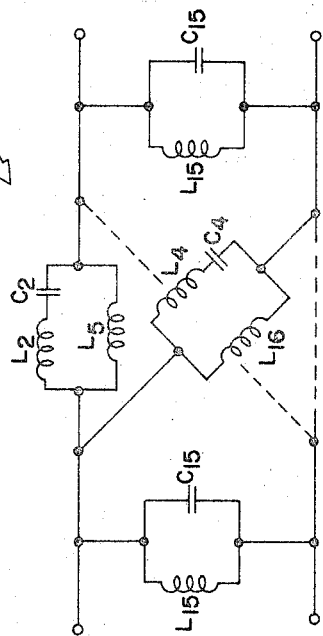

(A) Transformation of circuit of FIG. 4 to circuit of FIG. 6.

Figure 8:
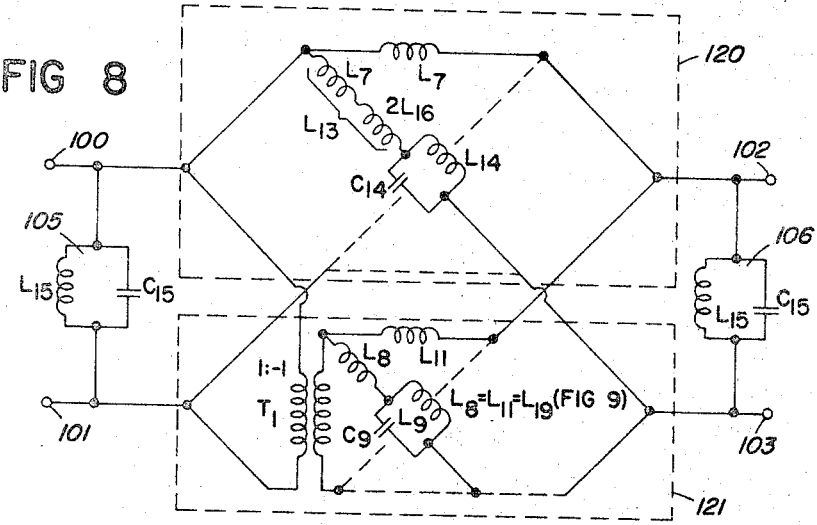

(B) Transformation of circuit of FIG. 6 to circuit of FIG. 8.

Figure 9:
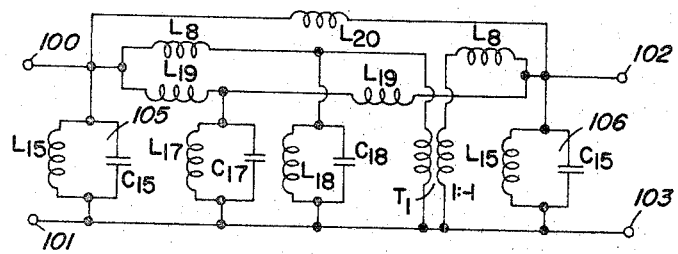

(C) Transformation of circuit of FIG. 8 to circuit of FIG. 9.

(III) Transformations for changing parameters of equivalent circuits to correspond to mechanical filter having feasible physical parameters.

(I) GENERAL STRUCTURE OF THREE-DISC MECHANICAL FILTER SECTION EMPLOYING MULTI-DIAMETER MODE DISC AND EQUIVALENT CIRCUIT THEREOF

Figure 1A:
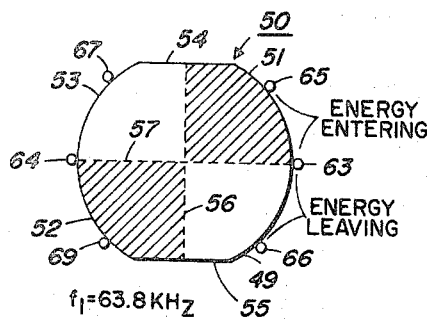
FIGS. 1a and 1b show two diameter modes of vibration of a multi-diameter mode disc and the relative orientation of the nodal lines.

Referring now to FIG. 1a, there is shown a segmented disc 50 in the diameter mode operation. The disc is described as segmented because segments have been removed from the edges thereof, as shown by the flat sections 54 and 55. The purpose of such a segmentation is twofold; firstly, to provide a clearance for the bridging wire 68 in FIG. 2 and, secondly, to provide a negative loading for the disc which results in the desired multi-diameter mode operation.

Figure 1B:
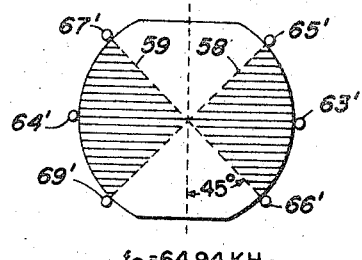
Figure 2:
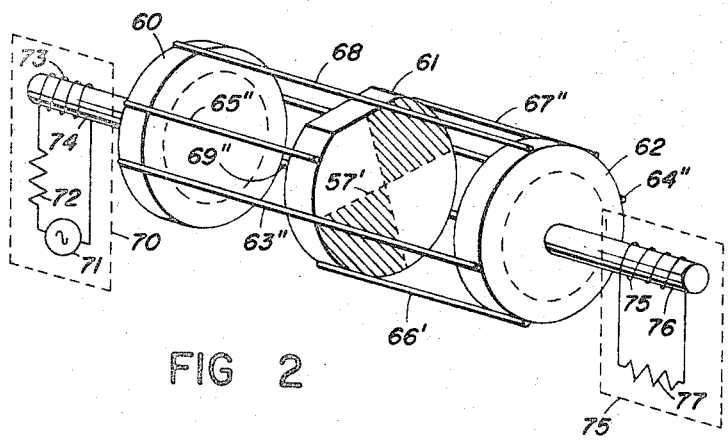
FIG. 2 is a perspective view of the three-disc mechanical filter section of the invention with the center disc being a multi-diameter mode disc.

In FIG. 1a the resonant frequency is designated as being 63.8 kHz. This frequency is a typical one obtainable in the diameter mode operation, but which can be varied over a considerable range by changing the diameter, the thickness, and the segmentation of the disc. It can be seen from FIG. 1a that the disc has two diameter nodal lines 57 and 56, which are in quadrature, and which divides the disc into four pie-shaped segments 51, 52, 49, and 53. The shaded sectors 51 and 52 vibrate 180° out of phase with the unshaded sections 53 and 49. It is to be noted that the three coupling wires 65, 63, and 66 are also shown in FIG. 1b and FIG. 2, and that in FIGS. 1a and 2, the coupling wire 63 is secured to all three discs, and specifically is connected to nodal line 57' of the multi-mode disc at frequency $f_1$. On the other hand, coupling wires 65 and 69 which couple disc 60 to disc 61 in FIG. 2 and coupling wires 66 and 67, which couple disc 61 to disc 62, are connected to nodal lines 58 and 59 of the second diameter mode frequency $f_2$, as shown in FIG. 1b. It can be seen then from FIG. 1a that at a frequency between $f_1$ and $f_2$ when the amount of energy transferred from disc 60 to disc 62 through coupling wires 65'', 69'', 67'', and 66'' in FIG. 2, is equal to the amount of energy transferred from disc 60 to disc 62 through coupling wires 63'' and 64'', but of opposite phase, cancellation will occur and an attenuation pole will result, as shown at point 101 in the curve of FIG. 17.

More specifically, between $f_1$ and $f_2$ the disc 61 vibrates in a mode that is a combination of the first and second modes. Thus some energy is transferred from 60 to 62 through wires 63'' and 64''. In addition, some energy is transferred from 60 to 62 by means of wires 65'', 69'', and the set 66'' and 67'', which are displaced from the coupling wires 65'' and 69'' by 90° around the perimeter of disc 61. Such 90° phase displacements result in an energy transfer 180° out of phase with the energy transferred into disc 62 from disc 61 through coupling wires 63'' and 64'' and is also 180° out of phase with the little energy transferred from disc 60 to 62 through coupling wire 68.

Because the second diameter mode is closer in frequency to the upper stopband than the first and because of the larger diameter wires 63'' and 64'' in comparison to 65'', 66', 67'', and 69'', most of the energy transferred from disc 60 to disc 62 will be transferred through the coupling wires 63' and 64', and the bridging wire 68 (FIG. 2).

As stated hereinbefore, the total cross-sectional area of the coupling wires 63'' and 64'' is considerably larger than the total cross-sectional area of bridging wire 68, so that considerably more energy is transferred through the coupling wires 63'' and 64'' within the passband. On the other hand, the coupling wires 63'' and 64'' are both attached to all three discs 60, 61, and 62, whereas the bridging wire 68 is attached only to discs 60 and 62. Thus, above the upper edge of the passband, the greater attenuation in coupling wires 63'' and 64'', due to their attachment to each of the three discs, causes the energy transferred therethrough to decrease at a much faster rate than the decrease in energy transferred through coupling wire 68. A point is reached where the energy transferred through coupling wires 63'' and 64'' is equal to the energy transferred through bridging wire 68 but 180° out of phase therewith, so that an attenuation pole results. The 180° phase relationship between the two energy transfers is due to the fact that a 180° transfer of energy occurs between adjacent discs near the upper end of the passband, as discussed above. Thus the energy transferred from disc 60 to disc 62 through coupling wires 63'' and 64'' undergoes two 180° phase shifts, whereas the energy transferred to the bridging wire 68 undergoes only a single 180° phase shift.

The means for driving the mechanical filter section of FIG. 2 is included within the dotted block 70 and specifically includes a signal source 71, a resistor 72, a coil 73, and a transducer 74 which transforms the electrical energy into mechanical energy. The means for converting the mechanical signal back into an electrical signal is included within dotted block 75 and specifically comprises a transducer 76, a pickup coil 75, and suitable load means 77.

Figure 3:
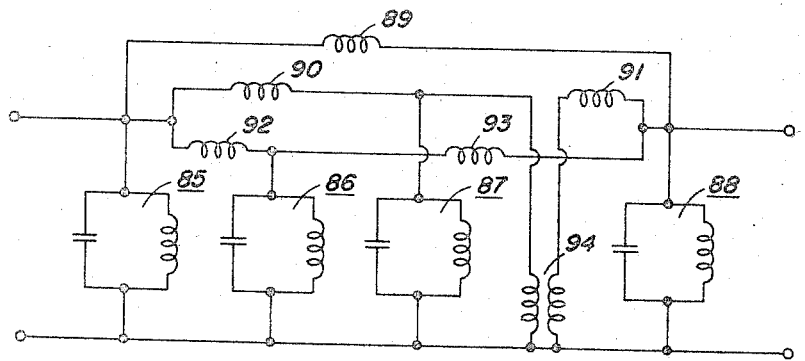
FIG. 3 is an equivalent electrical circuit of the structure of FIG. 2.

The equivalent electrical circuit of the structure of FIG. 2 is shown in FIG. 3. Specifically, the following components of the circuit of FIG. 3 correspond to mechanical elements of FIG. 2. The tank circuits 85 and 88 represent discs 60 and 62. The multi-diameter mode disc 61 of FIG. 2 is represented by a tank circuit for each mode of operation. Specifically, tank circuits 86 and 87 represent the modes of operation $f_1$ and $f_2$ of multi-mode disc 61. The inductors 92 and 93 represent the sum of the stiffnesses of coupling wires 63'' and 64''. The inductor 90 represents the coupling wires 65'' and 69'', and inductor 91 represents coupling wires 66'' and 67''. To accommodate the fact that coupling wires 65'' and 69'' and coupling wires 66'' and 67'' are connected to segments of multi-mode disc 61, whose vibrations are 180° out of phase, there is provided a transformer 94 which functions to reverse phase.

Representing the bridging coupling wire 68 is inductor 89 of FIG. 3. There is no means shown in FIG. 3 corresponding to the driving and receiving sources 70 and 75 of FIG. 2.

Figure 5:
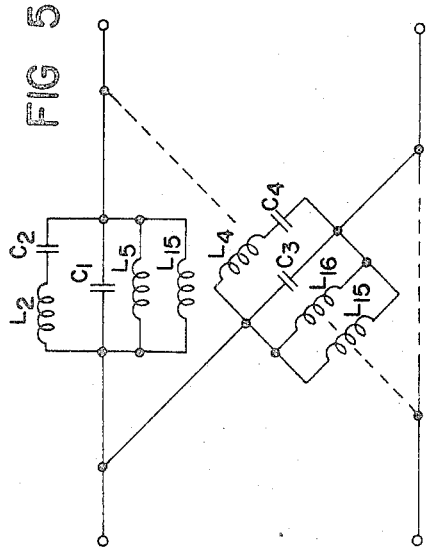

(II) TRANSFORMATIONS FOR CONVERTING WELL-KNOWN GENERAL STOPBAND LATTICE TYPE FILTER NETWORK TO EQUIVALENT CIRCUIT OF MECHANICAL FILTER (A) *Transformation of circuit of FIG. 4 to circuit of FIG. 6.*—The use of a complex variable transformation $$Z = \frac{S^2 + 1.0}{S^2 + a^2}$$

where $a$ is the lower cutoff frequency and 1.0 is the upper cutoff frequency of the bandpass filter, makes it possible to realize filters having equal ripple passbands and arbitrary stopband attenuation poles. For a proof of the foregoing statement reference is made to an article entitled "On the Design of Filters by Synthesis" by R. Saal and E. Ulbrich appearing in the December 1958 issue of the IRE Transactions on Circuit Theory. Application of the above design method results in a single section lattice network of the type shown in FIG. 4. In FIG. 4 it can be shown that by setting the number of "half poles" of attenuation at infinity equal to three, the shunt capacitors $C_1$ and $C_3$ are equal. Then, by changing the inductor $L_1$ of FIG. 4 into a parallel combination of two inductors $L_5$ and $L_{15}$, as shown in FIG. 5, and also changing the inductor $L_3$ in FIG. 4 into two parallel inductors $L_{16}$ and $L_{15}$, as shown in FIG. 5, there results equal inductors $L_{15}$ in both the series branch and the parallel branch and also equal capacitors $C_1$ and $C_3$ in both the series and parallel branches of the circuit of FIG. 5.

By a well-known circuit transformation, it is then possible to remove capacitors $C_1$ and $C_3$ and inductors $L_{15}$ from the series and parallel arms and to place them together in parallel as a separate tank circuit, as shown in FIG. 6.

(B) *Transformation of circuit of FIG. 6 to circuit of FIG. 8.*—In transforming the circuit of FIG. 6 to that of FIG. 8 inductors $L_5$ and $L_{16}$ of FIG. 6 are both first changed into two inductors in parallel. More specifically, inductor $L_5$ of FIG. 6 is changed into inductors $L_7$ and $L_6$ of FIG. 7. Similarly, inductor $L_{16}$ of FIG. 6 is changed into the parallel combination of inductors $L_{10}$ and $L_{11}$ of FIG. 7. Thus in FIG. 7 there results a circuit comprised of two lattice-type networks in parallel.

It is a well-known principle of circuit transformation that the series and the parallel arms of a lattice-type network can be interchanged by adding an inverting transformer into the circuit. Thus in FIG. 8, by the addition of inverting transformer $t_1$ having a turns ratio of unity, the two arms of the lattice-type network in which the transformer is inserted are reversed. At the same time the complex parallel circuit consisting of inductors $L_2$, $L_6$, and capacitor $C_2$ of FIG. 7 is, in FIG. 8, transformed into the circuit comprised of inductors $L_8$, $L_9$, and $C_9$.

Figure 7:
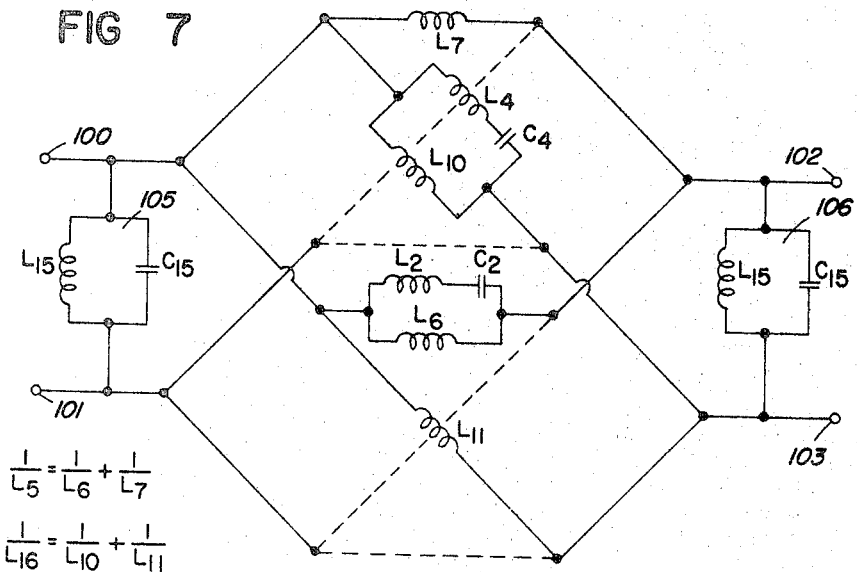

In the transformation of the circuit of FIG. 6 to that of FIG. 7 wherein the inductor $L_5$ of FIG. 6 is changed into a parallel combination of inductors $L_6$ and $L_7$, care must be taken so that inductor $L_6$ is of such a value that when the transformation from FIG. 7 to FIG. 8 is made, the value of inductor $L_8$ is equal to $L_{11}$. This condition is necessary in order to eventually arrive at the circuit of FIG. 9 which is the equivalent electrical circuit of the three-disc mechanical filter.

(C) *Transformation of the circuit of FIG. 8 to the circuit of FIG. 9.*—The transformation of the circuit of FIG. 8 into that of FIG. 9 is done in two basic steps, each involving a series of transformations. The first step, or series of transformations, involves the upper half of the circuit of FIG. 8 within the dotted block 120. Such lattice-type circuit is transformed into the circuit of FIG. 16 with the aid of the transformation shown in FIGS. 13, 14, and 15.

Figure 10:
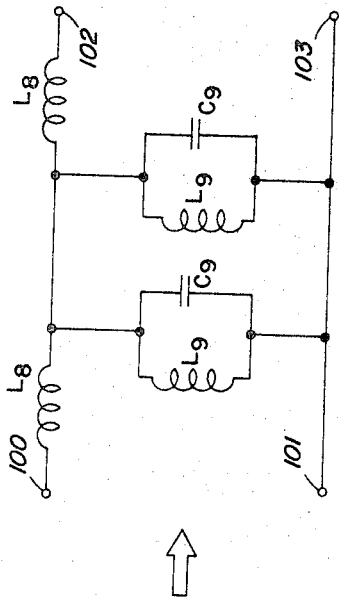

The second basic series of transformation involves the lattice-type network within the dotted block 121 in the circuit of FIG. 8. Such lattice-type network is transformed into the circuit of FIG. 12 with the aid of the transformation shown in FIGS. 10 and 11.

Figure 12:
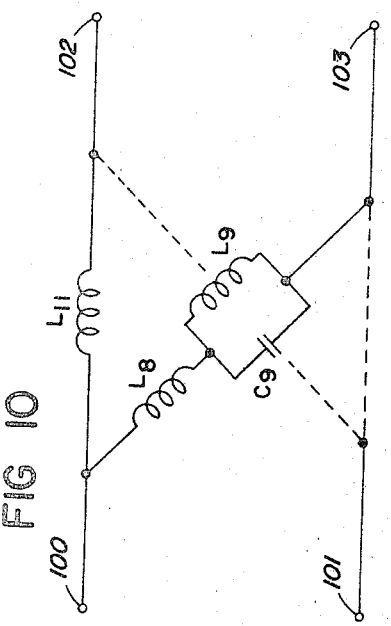

The circuits of FIGS. 16 and 12, which have common input and output terminals, are then combined into the circuit of FIG. 9.

Consider now the transformation of the upper half 120 of the circuit of FIG. 8 into the circuit of FIG. 16. The circuit within block 120 is redrawn separately as FIG. 13. Since inductor $L_7$ exists in both the series and the parallel arms of the network, it can be extracted therefrom and placed in series therewith, as shown in FIG. 14. Such a transformation leaves the two identical circuits each comprised of an inductor $2L_{16}$ and a tank circuit comprised of inductor $L_{14}$ and capacitor $C_{14}$ in parallel. Combining said two parallel circuits results in the T network of FIG. 15 in which the parallel portion of the circuit consists of an inductor $L_{16}$ in series with a tank circuit consisting of inductor $L_{17}$ and capacitor $C_{17}$. $L_{17}$ is equal to one-half $L_{14}$ of FIG. 14, and $C_{17}$ is equal to $2C_{14}$ of FIG. 14.

By the well-known Y to delta transformation, the Y circuit of FIG. 15 consisting of $L_7$, $L_7$, and $L_{16}$ is transformed into the delta circuit of FIG. 16 consisting of inductors $L_{20}$, $L_{19}$, and $L_{19}$.

Figure 11:
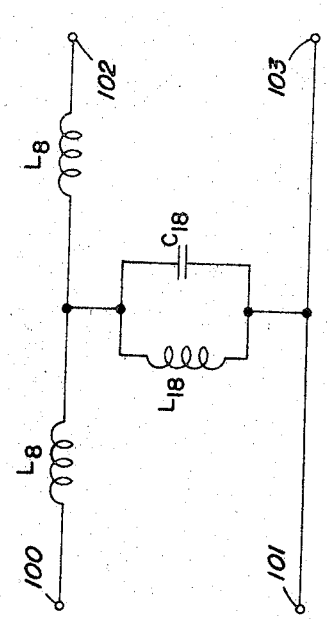

Consider now the transformation of the lower half 121 of the circuit of FIG. 8 to the circuit of FIG. 12. Specifically, the lattice-type network within dotted block 121 of FIG. 8 is redrawn as FIG. 10. As discussed hereinbefore, the values of $L_8$ and $L_{11}$ have been caused to be equal by proper manipulation in prior circuit transformations, as discussed hereinbefore. Therefore, inductors $L_8$ and $L_{11}$ can be extracted from the lattice-type network and placed in series therewith, as shown in FIG. 11, where $L_8$ represents both the inductors $L_8$ and $L_{11}$ of FIG. 10. The two tank circuits in parallel of FIG. 11 are combined to form the circuit shown in FIG. 12, where $L_{18}$ is equal to $L_{9/2}$ and $C_{18}$ is equal to $2C_9$.

The circuits of FIG. 12 and FIG. 16 have common input and output terminals and are combined to form the circuit of FIG. 9. The tank circuits 105 and 106 of FIG. 8 are added to complete the circuit of FIG. 9 into its final form, which is equivalent to the circuit of FIG. 3.

(III) TRANSFORMATIONS FOR CHANGING PARAMETERS OF EQUIVALENT CIRCUITS TO CORRESPOND TO MECHANICAL FILTER HAVING FEASIBLE PHYSICAL PARAMETERS

In arriving at the equivalent circuit of FIG. 9 no precautions were taken to insure that the values of $C_{15}$, $C_{17}$, and $C_{18}$, which represent the equivalent masses of the discs, would be such that the physical sizes of the represented discs would be suitable for an actual mechanical filter. More specifically, it is necessary that the diameter of all the discs in a mechanical filter have the same diameter for practical construction purposes. Consequently, some circuit transforms must be employed to change the values of $C_{15}$, $C_{17}$, and $C_{18}$ of FIG. 9 to values which do represent discs suitable for use in the same mechanical filter. Such transforms are shown in FIGS. 18, 19, 20, 21, 22, and 23.

Referring now to FIG. 18, there is shown a portion of the circuit of FIG. 9 including the inductors $L_{19}$, $L_{19}$, $L_{17}$, and capacitor $C_{17}$. By Norton's transformation it is possible to transform each of the inductors $L_{19}$ into another circuit comprised of a pi-network and a transformer as shown in FIG. 19, and specifically, including inductors $L_{21}$, $L_{22}$, $L_{23}$, and transformer $T_2$. The second inductor $L_9$ in FIG. 18 is transformed into a similar circuit also comprised of inductors $L_{21}$, $L_{22}$, $L_{23}$, and transformer $T_3$, which has the same turns ratio as transformer $T_2$.

In accordance with Norton's transformation, transformer $T_2$ can be made to have any turns ratio which will, of course, affect the values of inductors $L_{21}$, $L_{22}$, and $L_{23}$. The particular turns ratio which will be given transformer $T_2$ is determined by the value of $C_{17}$ in FIG. 9 and the desired new value. For example, assume that the value of $C_{17}$ in FIG. 9 is 50 microfarads, which represent a disc whose equivalent mass is too small. It is desired to increase the equivalent mass to a value represented by a capacitor of 1250 microfarads. To accomplish this the turns ratio of transformer $T_2$ must be five (5). Then the reflected value of $C_{17}$ from the terminals 125 and 126 of FIG. 19 and looking through transformer $T_2$ is $5^2 \times 50$, or 1250 microfarads.

If the inductance and capacitance values of $L_{17}$ and $C_{17}$ are transformed to their reflected values, $T_2$ can be transferred to the other side of the tank circuit. Such transfer of transformer $T_2$ is shown in FIG. 20. Now, if the same series of transformations is made with respect to transformer $T_3$, and the associated inductors $L_{21}$, $L_{22}$, and $L_{23}$ on the right-hand portion of FIG. 19, the turns ratios of transformers $T_2$ and $T_3$ will be the same but will be of opposite polarity so that the effects of transformers $T_2$ and $T_3$ cancel each other and can be omitted from the circuit.

It is to be remembered that in transferring transformer $T_2$ over to the right-hand side of FIG. 20, the value of $C_{17}$ must be changed to 1250 microfarads in order to maintain the same impedance looking into the circuit from terminals 125 and 126. It is further to be noted that the value of $L_{17}$ must be divided by a factor of 25 so that $L_{24}$ in FIG. 20 is equal to $L_{17/25}$.

After combining the transformers $T_2$ and $T_3$ and omitting said transformers, there results the circuit of FIG. 21.

In FIG. 21 it will be noted that each component is identified by two reference characters. For example, the inductor $L_{23}$ is also identified as ($L_{27}$). The parenthetical values of the various components of FIG. 21 represent the component values that are obtained by applying the same series of transformations to another part of FIG. 9 as were applied to the circuit of FIG. 18. More specifically, the circuit consisting of inductors $L_8$, $L_8$, and tank circuits consisting of inductors $L_{18}$ and $C_{18}$, and transformer $T_1$ can be transformed into circuit of FIG. 21 and having the values shown in parenthesis therein.

The transformer $T_1$ appears in the circuit FIG. 21 as dotted transformer $T_1$. It is to be understood that said transformer $T_1$ only appears in the equivalent circuit of FIG. 21 in the case where the second transformation originated from the circuit comprised of inductors $L_8$, $L_{18}$, $C_8$, and $C_{18}$ and transformer $T_1$ of FIG. 9.

Figure 22:
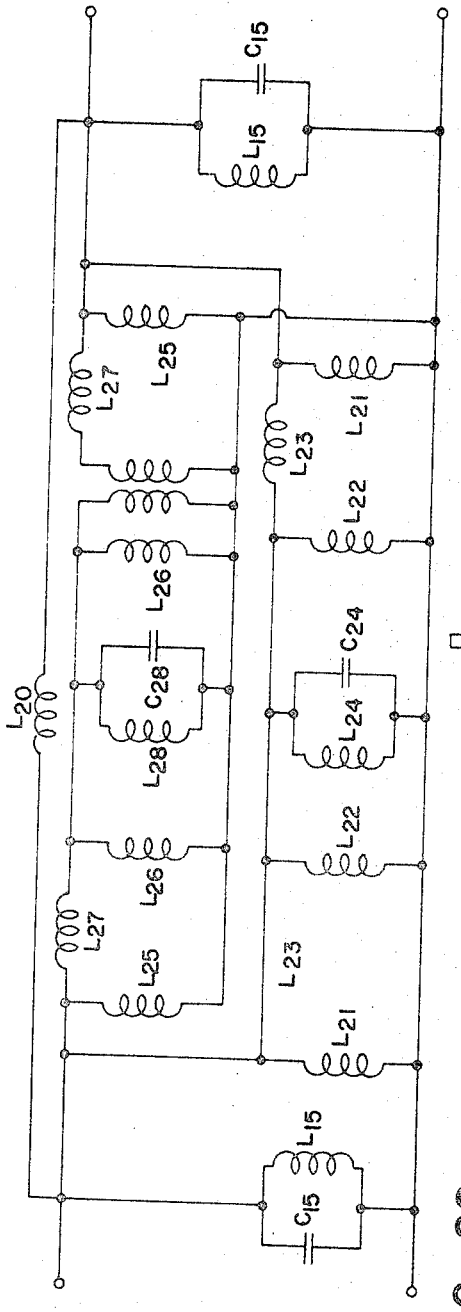

Recombining the two circuits represented by the single diagram of FIG. 21, there is obtained the circuit of FIG. 22. In FIG. 22 $L_{25}$, $L_{21}$, and $L_{15}$ at both ends of the drawing, are in parallel, and can be combined to form the single inductor $L_{29}$. Similarly, inductors $L_{26}$, $L_{28}$, and $L_{26}$ are in parallel and combine to form the single inductor $L_{31}$. A further combination includes inductors $L_{22}$, $L_{24}$, and $L_{22}$ which combine to form a single inductor $L_{30}$, as shown in FIG. 23.

Figure 23:
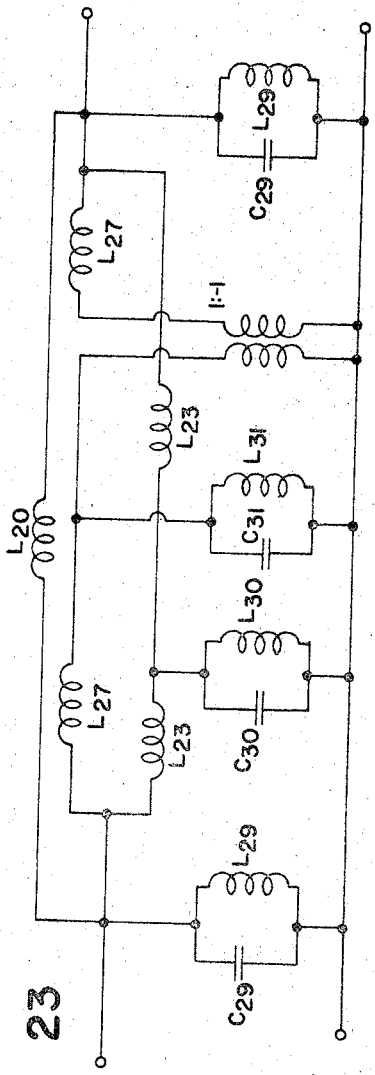

Thus the resulting circuit of FIG. 23 has the same topology as the circuit of FIGS. 9 and 3, but has component values of capacitors and inductors which are adjusted to represent feasible physical parameters of discs and coupling wires of the mechanical filter.

It is to be understood that the forms of the invention shown and described herein are but preferred embodiments thereof and that various changes may be made therein without departing from the spirit or scope of the invention.

I claim:

1. A mechanical filter section of the stacked disc type and comprising:

first and second circular mode-type discs;

a third, segmented multi-diameter mode type disc having first and second diameter modes of vibration positioned between said first and second discs with the axes of all three discs lying along a common line and spaced apart a distance less than a wavelength of the nominal center frequency of the filter passband;

first coupling wire means secured to the perimeters of said first and second circle mode type discs and to the perimeter of said diameter mode disc at a nodal diameter of a first diameter mode of vibration;

second coupling wire means secured only to the perimeter means of said first circle mode type disc and to the perimeter of said diameter mode type disc at a first nodal diameter of a second diameter mode of vibration;

third coupling wire means secured only to the perimeter of said second circle mode type disc and to the perimeter of said diameter mode type disc at said second nodal diameter of second diameter mode of vibration;

and fourth coupling wire means connected to said first and second circle mode type discs and passing freely by said third multi-diameter mode type disc over the segmented portion thereof.

2. A mechanical filter section in accordance with claim 1 in which said third multi-diameter mode disc has its first diameter mode of vibration occur below the passband of the filter and its second diameter mode of vibration occur within the filter passband.

3. A mechanical filter section in accordance with claim 2 in which said second and third coupling wire means are connected, respectively, to points on the perimeter of said third diameter mode disc which lie in sectors of oppositely phased vibrations of said first diameter mode of operation.

4. A mechanical filter section of the stacked disc type and comprising:

first and second circle mode type discs;

a third multi-diameter mode type disc having first and second diameter modes of vibration and positioned between said first and second discs with the axes of said first, second, and third discs all lying along a common line and spaced apart a distance less than the wavelength of the nominal center frequency of the filter passband;

first coupling wire means secured to the perimeters of said first and second discs and to the perimeter of said third disc at a diameter nodal line of a first diameter mode of vibration;

second coupling wire means secured only to the perimeter of said first disc and to the perimeter of said third disc at a first diameter nodal line of said second diameter mode of vibration;

third coupling wire means secured only to the perimeter of said second disc and to the perimeter of said third disc at a second diameter nodal line of said second diameter mode of vibration.

5. A mechanical filter section in accordance with claim 4 in which said third multi-diameter mode disc has its first diameter mode of vibration occur below the passband of the filter and its second diameter mode of vibration occur within the filter passband.

6. A mechanical filter in accordance with claim 5 and comprising:

fourth coupling wire means connected to the perimeters of said first and second discs and unconnected to the perimeter of said third disc.

7. A mechanical filter section in accordance with claim 5 in which said second and third coupling wire means are connected, respectively, to points on the perimeter of said third disc which lie in sectors of oppositely phased vibrations of said first diameter mode of operation.

8. A mechanical filter in accordance with claim 7 and comprising:

fourth coupling wire means connected to the perimeter of said first and second discs and unconnected to the perimeter of said third disc.

9. a mechanical filter of the stack disc type and comprising:

first and second circle mode type discs;

a third multi-diameter mode type disc having first and second diameter modes of vibration with the axes of said first, second, and third discs all lying along a common line and spaced apart a distance less than the wavelength of the nominal center frequency of the filter passband;

first coupling wire means secured only to the perimeter of said first disc and to the perimeter of said third disc at a first diameter nodal line of the second diameter mode of vibration of said third disc;

second coupling wire means secured only to the perimeter of said second disc and to the perimeter of said third disc at a second diameter nodal line of said second diameter mode of vibration.

10. A mechanical filter section in accordance with claim 9 in which said third multi-diameter mode disc has its first diameter mode of vibration occur below the passband of the filter and its second diameter mode of vibration occur within the filter passband.

11. A mechanical filter in accordance with claim 10 and comprising:

third coupling wire means connected to the perimeters of said first and second discs and unconnected to the perimeter of said third disc.

12. A mechanical filter section in accordance with claim 10 in which said first and second coupling wire means are connected, respectively, to points on the perimeter of said third disc which lie in sectors of oppositely phased vibrations of said first diameter mode of operation.

13. A mechanical filter in accordance with claim 12 and comprising:

third coupling wire means connected to the perimeters of said first and second discs and unconnected to the perimeter of said third disc.

(References on following page)

References Cited

UNITED STATES PATENTS

| | | | |
|---|---|---|---|
| 3,439,295 | 4/1969 | Bise | 333—72 X |
| 3,440,572 | 4/1969 | Bise | 333—71 X |
| 3,440,574 | 4/1969 | Johnson et al. | 333—71 X |
| 3,135,933 | 6/1964 | Johnson | 333—30 X |

HERMAN K. SAALBACH, Primary Examiner

T. VEZEAU, Assistant Examiner